United States Patent [19]

Metz et al.

[11] Patent Number: 5,754,539
[45] Date of Patent: May 19, 1998

[54] LOCAL AREA NETWORK FOR USE IN OFFICE COMMUNICATIONS AND A CIRCUIT ARRANGEMENT THEREFOR

[75] Inventors: Manfred Metz, Ditzingen; Gerd Siegmund, Stuttgart, both of Germany

[73] Assignee: Alcatel N.V., Netherlands

[21] Appl. No.: 628,026

[22] Filed: Apr. 4, 1996

[30] Foreign Application Priority Data

Apr. 13, 1995 [DE] Germany ..................... 195 14 043.5

[51] Int. Cl.⁶ ..................... H04L 12/56; H04B 7/00
[52] U.S. Cl. ..................... 370/349; 370/396; 370/426
[58] Field of Search ..................... 370/310, 313, 370/338, 349, 352, 360, 395, 396, 419, 420, 426; 379/58, 94; 455/403, 426

[56] References Cited

U.S. PATENT DOCUMENTS

| 4,640,989 | 2/1987 | Riner et al. ..................... 379/94 |
| 4,789,983 | 12/1988 | Acampora et al. ..................... 370/349 |
| 5,199,072 | 3/1993 | White et al. ..................... 380/44 |
| 5,550,906 | 8/1996 | Chau et al. ..................... 379/207 |
| 5,623,495 | 4/1997 | Eng et al. ..................... 370/397 |

FOREIGN PATENT DOCUMENTS

| 4406354 | 8/1994 | Germany . |
| 4330031 | 9/1994 | Germany . |
| 4406505 | 8/1995 | Germany . |
| 6105115 | 6/1994 | Japan . |
| 2242335 | 9/1991 | United Kingdom . |

OTHER PUBLICATIONS

Friedman, Herb: "Communications Corner" In: Radio-Electronics, Jul. 1986, S. 89–90.
Siegmund, Gerd: "ATM in lokalen Netzen", In: Nachrinchtentech, Elektron, Science, Berlin 44, 1994, 5, S. 69–72.
Gaudin, Mark A., et al: "The 5ESS. Wireless Mobile Switching Center", In: AT&T Technical Journal, Jul./Aug. 1993, S. 38–47.

Knuppertz, Hans–Walter, "Computer funkt selbst", In: Funkschau Apr. 1988, S 63–64.

Pawlita, Peter: "Effizienter telefonieren mit Computerhilfe", In: Siemens–Zeitschrift Apr. 1991 S. 13–16.

Baum, Günter: "Ein ideales Paar", In: telecom report, 1994, H.6, S. 264–267.

Primary Examiner—Hassan Kizou
Attorney, Agent, or Firm—Ware, Fressola, Van Der Sluys & Adolphson LLP

[57] ABSTRACT

LAN's are customarily used for pure data communication. Voice communication via a LAN is only possible with the constraint of other subscribers being subjected to long waiting periods during the relatively long occupation time. The present LAN expands the functionality of work stations connected to the LAN, by using ATM technology to meet the communication requirements of an office environment. A network node or a conventional work station (3) is expanded by means of a unit which performs switching technology functions, so that terminals of the most different types (4, 5, 6, 7) can access the LAN via interface circuits (41, 51, 61, 71), resulting in a private network with distributed telecommunication installations. In this way, real-time connections with different bandwidth requirements, such as for example video conferences and pure voice transmission, are made possible. The thus expanded ATM-LAN is suitable for all types of communications taking place in an office.

3 Claims, 4 Drawing Sheets

LOCAL AREA NETWORK FOR USE IN OFFICE COMMUNICATIONS AND A CIRCUIT ARRANGEMENT THEREFOR

TECHNICAL FIELD

The invention concerns the expanded use of a local area network, briefly called LAN, in an office environment. The expanded use of the LAN is particularly directed to performing switching technology functions.

BACKGROUND OF THE INVENTION

As a rule, a LAN is a geographically restricted data communications network for several independent devices, for example work stations. In a conventional LAN, only one subscriber at a time can use the transmission path of a work station to transport data from one work station to another.

With the usually large number of connected work stations, a single work station on the average only has access to a small portion of the full transmission capacity. This disadvantage was compensated for by ever higher transmission speeds, as far as this was technologically and economically justifiable. In addition, the access methods of a LAN only offer limited support for real-time services. Thus, voice transmission through a LAN is only possible with the constraint that during the relative long occupation time of the transmission medium common to all subscribers, the use by other subscribers is not possible and is therefore subject to long waiting periods.

It is known that the efficiency of a LAN can be significantly improved by using the Asynchronous Transfer Mode, briefly called ATM, for exchanging information, see G. Siegmund: ATM in Local Area Networks, Electronics, Berlin 44 (1994), brochure 5, pages 69 to 72.

ATM-LAN structures are based on arrangements in which the work stations are connected in star-form to a central or even to several decentralized network nodes. Within the network nodes, all connections are switched by a coupling array. The coupling array in the network node enables the simultaneous switching of several connections, by having the network node process the ATM cells of different connections in parallel. Although maintaining simultaneous interactive connections, for example to process text, and real-time connections, for example to hold a video conference, is possible in an ATM-LAN without any reciprocal constraint, the desire of expanding the possibilities of using an ATM-LAN is still present.

SUMMARY OF THE INVENTION

Thus the task of the invention is to expand the functionality of the work stations connected to a LAN, by using the advantages of the ATM, for example to meet the communication requirements of an office environment.

This task is fulfilled by a local area network comprising at least one network node and a number of work stations for use in an environment with different communication requirements using Asynchronous Transfer Mode technology, characterized in that the respective network node and/or each work station is assigned a unit which performs switching technology functions, that can be accessed by wired terminals and cordless terminals via respective interface circuits, and that connections are established as needed for the exchange of information from: 1) a cordless terminal to a wired terminal, via the unit which performs switching technology functions, and is assigned to the respective network node and/or the work station; 2) from a wired terminal to a cordless terminal, via the unit which performs switching technology functions, and is assigned to the respective network node and/or the work station; 3) between one of the wired or cordless terminals assigned to a first work station, via the unit which performs switching technology functions and is assigned to the first work station, and via the network node, as well as via a unit which performs switching technology functions and is assigned to another work station, and a wired or cordless terminal assigned to this other work station; 4) or between a wired or cordless terminal assigned to a first work station, via the unit which performs switching technology functions and is assigned to the network node, as well as via another work station and a wired or cordless terminal assigned to that work station.

It is also fulfilled by a circuit arrangement for the local area network, characterized in that each work station has a unit which performs switching technology functions in such a way, that a signalling circuit, located in the work station, is connected to a coupling network via a control circuit, to which the interface circuits of wired terminals and a base station are connected for access to cordless terminals, and that the coupling network and the signalling circuit are connected via corresponding circuit arrangements, which provide the protocols of the ATM adaptation layers, to a circuit arrangement, which provides the protocol of the ATM layer and supports the ATM transmission.

The essence of the invention is that the work stations belonging to a LAN are supplemented with a simply constructed and cost-effective unit that is able to perform switching technology functions. The thus complemented work station functions like a small private branch exchange, to which different types of terminals, such as are required for communications in an office, can be connected. It is furthermore possible to centrally arrange the unit which performs switching technology functions in a network node, and leave the interface circuits for the terminals in the work stations.

BRIEF DESCRIPTION OF THE DRAWINGS

The invention will be explained in the following by means of a configuration example. In the pertinent drawing.

BEST MODE FOR CARRYING OUT THE INVENTION

Figure 1:
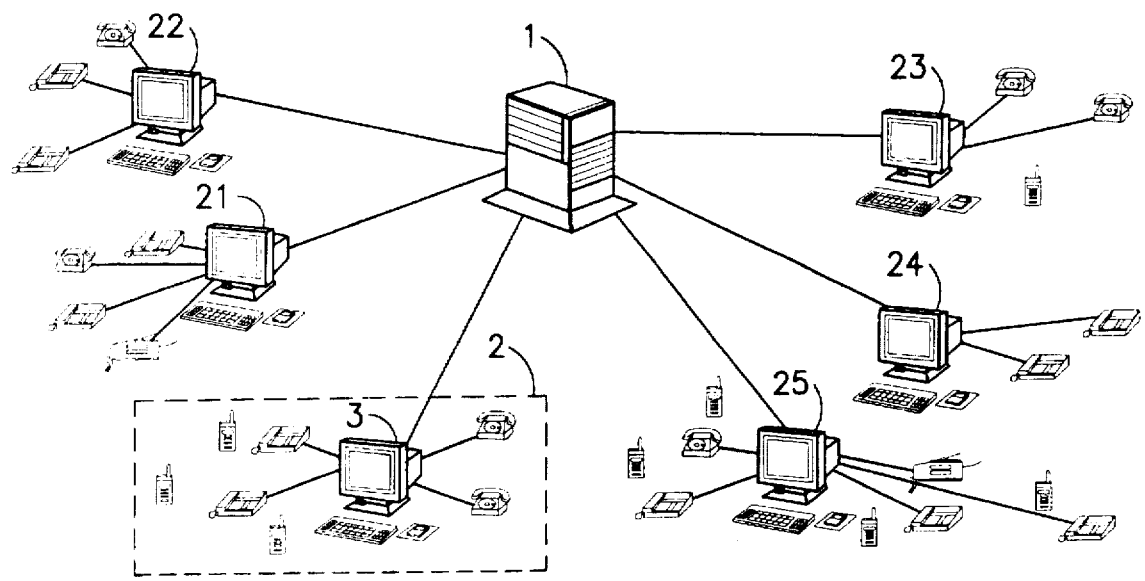
FIG. 1 is an illustration of an ATM-LAN for use in an office environment in accordance with the invention.
Figure 2:
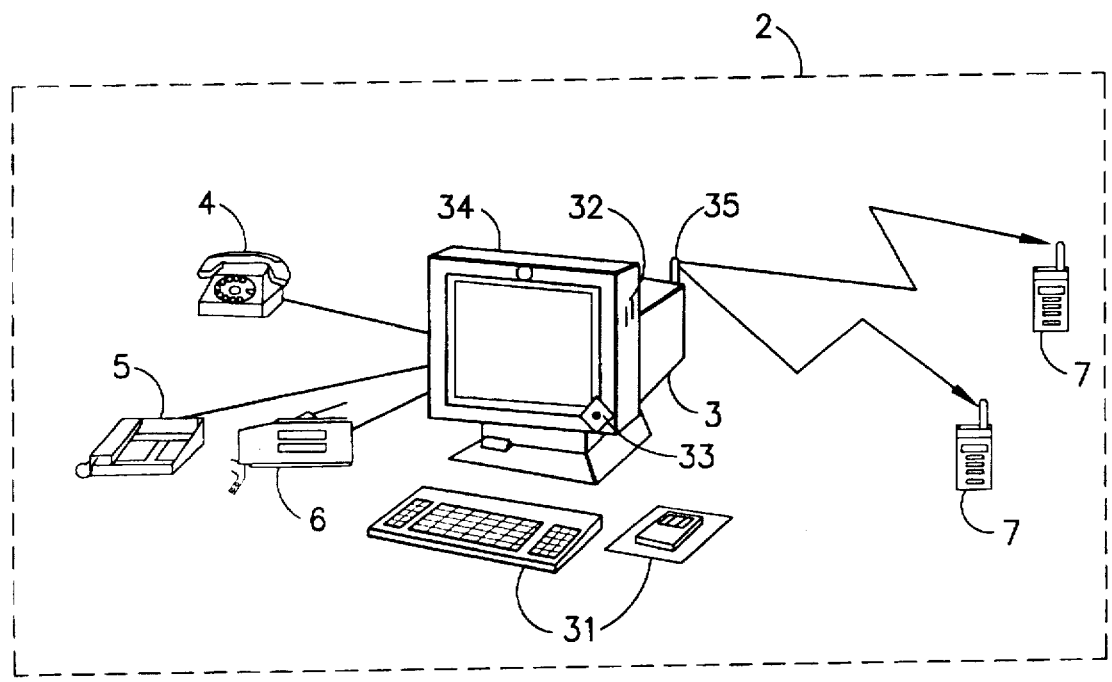
FIG. 2 is a work station with assigned wired terminals and cordless telephones.

In accordance with FIG. 1, an ATM-LAN comprises a network node 1 to which a number of work stations 2, 21, 22, 23, 24, 25 are connected in star-form via dual copper wires or optical waveguides. The network node 1 contains a central ATM switching element and in addition performs the function of a service provider, a so-called server. By the example of work station 2, FIG. 2 depicts the expansion of the functions of an ATM-LAN according to the invention, for the communication requirements of an office environment. The work station 3 known from the state of the art, with operating elements 31—a keyboard and a mouse, with a loudspeaker 32, a microphone 33 and a video camera 34, is expanded in accordance with the invention by a unit 8 illustrated in FIG. 3, which performs switching technology functions, indicated by an antenna in FIG. 2, and enables the connections to a simple telephone 4, which could be configured with analog circuit technology, to an added-feature telephone 5 with digital circuit technology, to a facsimile unit 6 and via a radio path to a DECT telephone 7.

Figure 3:
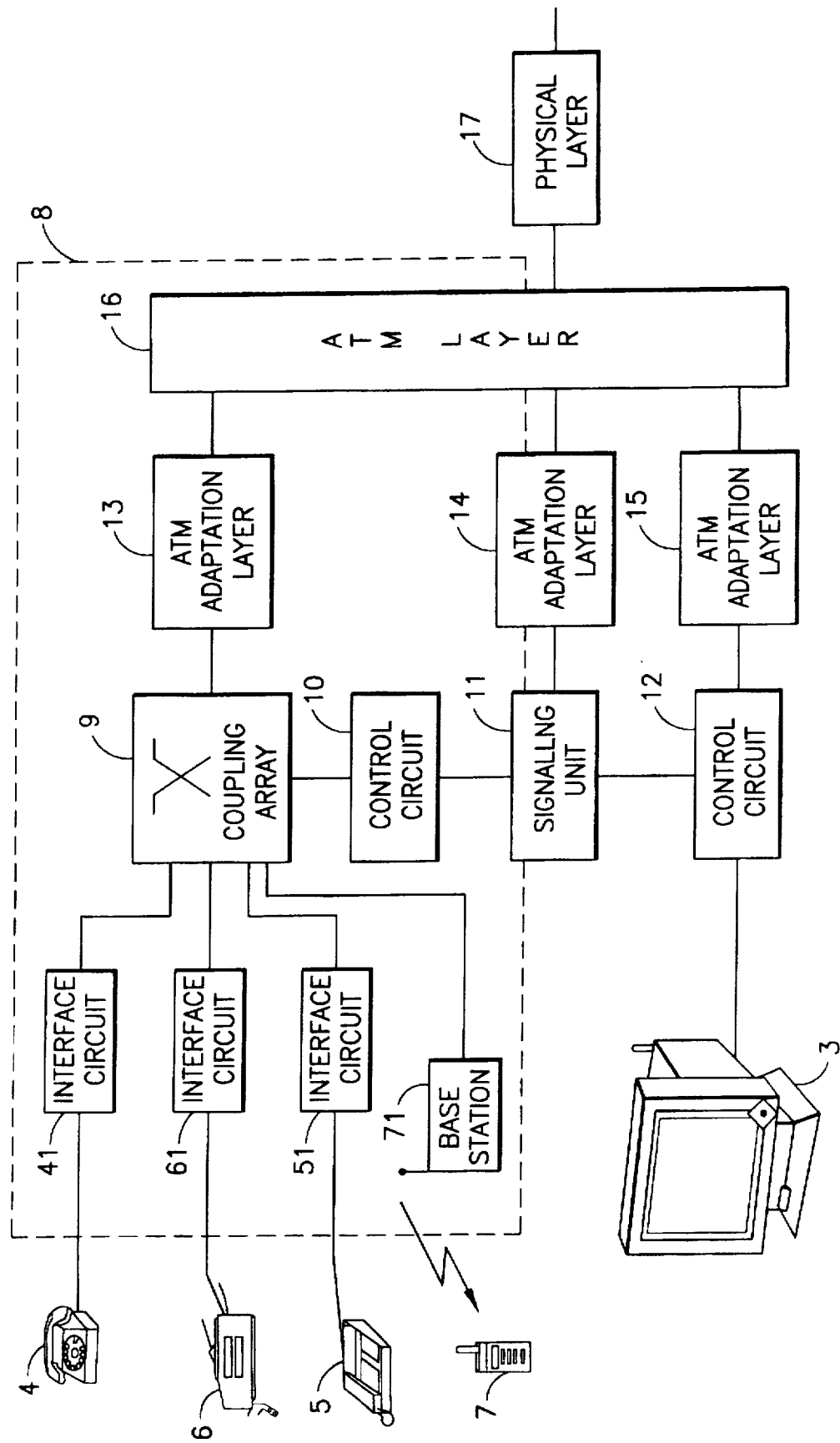
FIG. 3 is a diagram of the circuit arrangement of the invention.

The circuit arrangement of the unit 8 which performs switching technology functions is illustrated in FIG. 3. Accordingly, this unit 8 comprises a coupling array 9, which can be accessed by terminals via interface circuits, namely the simple telephone 4 through a first interface circuit 41, the added-feature telephone 5 through a second interface circuit 51, the facsimile unit 6 through a third interface circuit 61, and the DECT telephone 7 through a base station 71. The first interface circuit 41 can be any well-known a/b interface or z-interface used for connecting analog telephones. The second interface circuit 51 can be any generic ISDN interface or proprietary interface used to connect digital telephones or other digital apparatus. The third interface circuit 61 can be the same type of interface used for the first interface circuit. The fourth interface circuit 71 can be any well-known DECT, CT1+, CT2 or CT3 base unit for connecting any cordless telephone or similar type equipment. All of the above interfaces are known conventional PABX-interfaces. The function of these interfaces is to provide a connection between any telecommunication apparatus and switching network 9.

A signalling unit 11, which controls the work station 3 via a first control circuit 12, is also functionally used to control the coupling array 9 via a second control circuit 10. To realize the transmission of information with the ATM technology, a protocol structure was defined by the ITU-T, which is described by an ATM adaption layer, briefly AAL, by an ATM layer and by a physical layer, see G. Siegmund: ATM—The Technology of the Broadband ISDN. R. V. Decker Publishers, G. Schenck, Heidelberg 1993, pages 40–66. Different types of service of the ATM adaption layers 13, 14, 15 are indicated in FIG. 3 according to the different functions respectively, which form ATM cells from the digital user data, and in turn are processed by the ATM layer 16. The physical layer 17 transports the ATM cells and supplies the time information required by the ATM layer 16 for processing the ATM cells. In addition, this layer is responsible for the insertion or the removal of vacant cells. The coupling array 9 is connected to the ATM layer 16 through a type 1 13 ATM adaption layer, the signalling unit 11 through a type 5 14 ATM adaption layer, and the first control circuit 12 through a type 3/4 15 ATM adaption layer.

Figure 4:
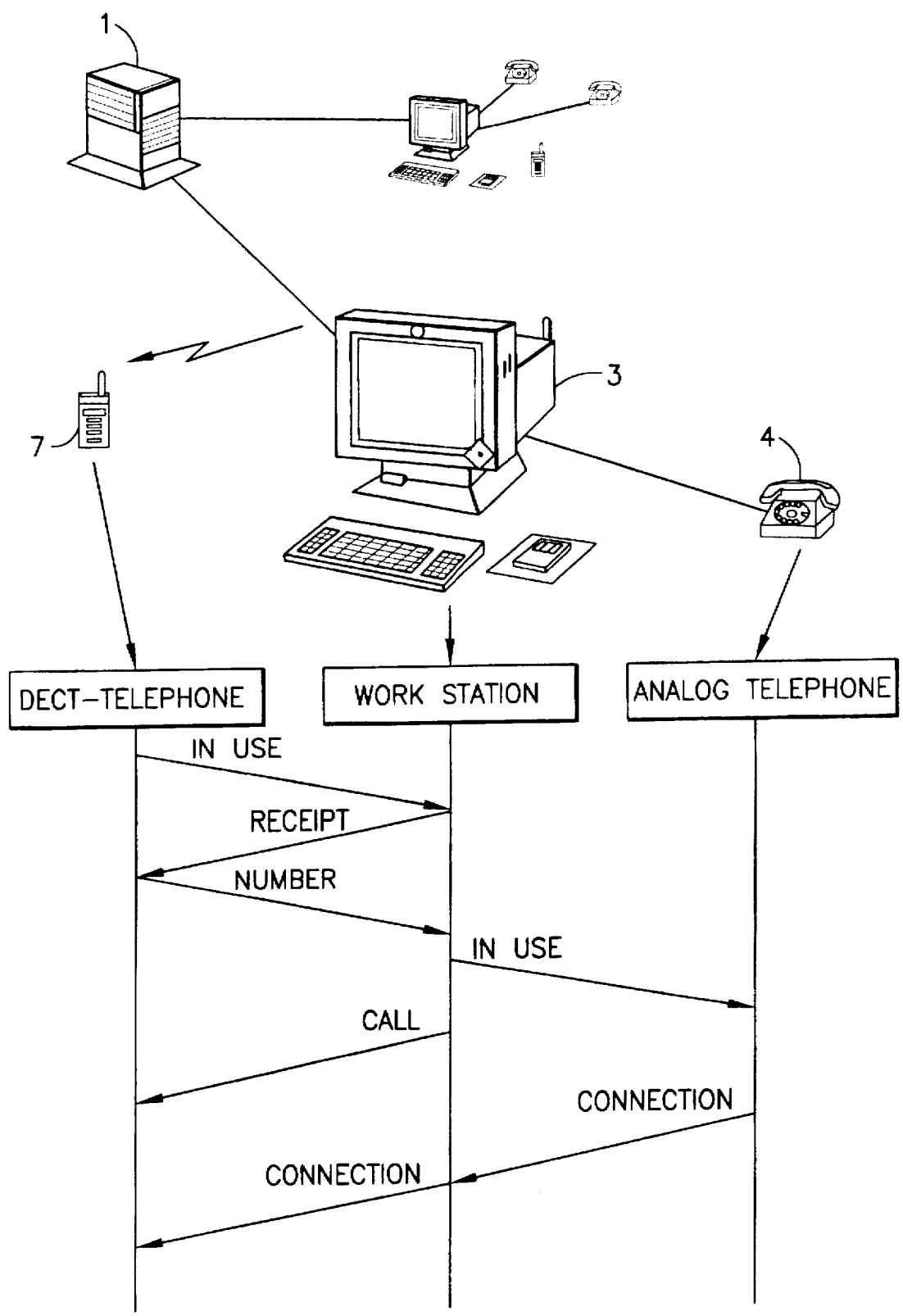
FIG. 4 is an illustration of the function of an internal connection.

FIG. 4 illustrates a possibility of using the work station 3 equipped with the unit 8 which performs switching technology functions. Because of the integrated switching function in work station 3, local call connections can be made from the DECT telephone 7 to the wired telephone 4, for example. In the same manner, the reverse connection can be established from the wired telephone 4 to the DECT telephone 7.

Figure 5:
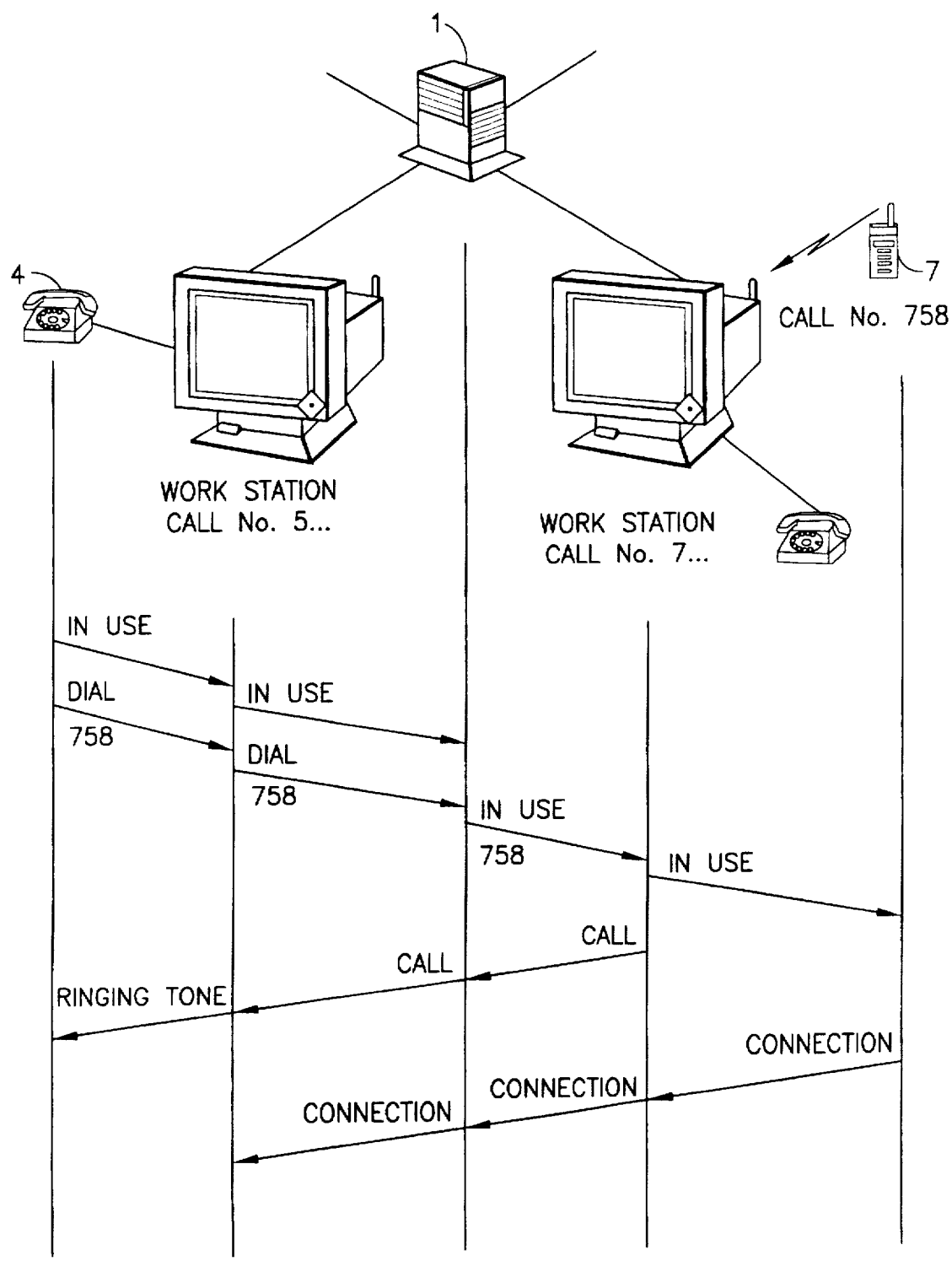
FIG. 5 is an illustration of the functional sequence of connecting the terminals of two work stations.

FIG. 5 illustrates the connection from a wired telephone 4 belonging to a work station with the call number 5 . . . . to a DECT telephone 7 belonging to a work station with the call number 7. . . . Depending on the size and type of the private network, corresponding call numbers can be assigned to the individual work stations, to create a private network with distributed telecommunication installations.

Through the expansion of the work station by means of a unit comprising switching technology functions, the separation between pure data communication, as is typical with the customary LAN's, and pure voice communication, as is known from the usual telecommunication installations, has been advantageously removed. In this way an ATM-LAN can be expanded by means of more terminal interface circuits for office communication requirements. Through ATM technology, real-time connections with different bandwidth requirements, such as for example video conferences and pure voice transmission, can be held simultaneously without reciprocal constraints. When the connection is established, each connection requires the respective transmission bandwidth. The ATM-LAN expanded according to the invention is suitable for all types of communications that can be used in an office, for example for voice communication, for facsimile services, for video conferences, for voice storage and for storing these types of communications in document and data files. In this way for example, a document can be stored in a server together with the text explaining this document. Due to the ability of a work station to jointly process voice, text, picture, graphics and video, a universally useable multimedia terminal is created in an ATM-LAN.

What is claimed is:

1. A local area network comprising at least one network node and a number of work stations for use in an environment with different communication requirements using Asynchronous Transfer Mode technology, characterized in that the respective network node (1) and/or each work station (2, 21, 22, 23, 24, 25) is assigned a unit (8) which performs switching technology functions, that can be accessed by wired terminals (4, 5, 6) and cordless terminals (7) via respective interface circuits (41, 51, 61, 71), and that connections are established as needed for the exchange of information from a cordless terminal (7) to a wired terminal (4, 5, 6), via the unit (8) which performs switching technology functions, and is assigned to the respective network node (1) and/or the work station, from a wired terminal (4, 5, 6) to a cordless terminal (7), via the unit (8) which performs switching technology functions, and is assigned to the respective network node (1) and/or the work station, between one of the wired or cordless terminals assigned to a first work station, via the unit (8) which performs switching technology functions and is assigned to the first work station, and via the network node (1), as well as via a unit (8) which performs switching technology functions and is assigned to another work station, and a wired or cordless terminal assigned to this other work station, and between a wired or cordless terminal assigned to a first work station, via the unit (8) which performs switching technology functions and is assigned to the network node (1), as well as via another work station to a wired or cordless terminal assigned to that work station.

2. A local area network as claimed in claim 1, characterized in that the wired terminals are selected from the group consisting of telephones with analog switching technology, added-feature telephones, facsimile units, ISDN telephones, video telephones and data processing units.

3. A circuit arrangement for the local area network claimed in claim 1, characterized in that each work station (3) has a unit (8) which performs switching technology functions in such a way, that a signalling circuit (11), located in the work station (3), is connected to a coupling network (9) via a control circuit (10), to which the interface circuits (41, 51, 61) of wired terminals (4, 5, 6) and a base station

(71) are connected for access to cordless terminals (7), and that the coupling network (9) and the signalling circuit (11) are connected via corresponding circuit arrangements (13, 14), which provide the protocols of the ATM adaptation layers, to a circuit arrangement (16), which provides the protocol of the ATM layer and supports the ATM transmission.

* * * * *